United States Patent
Harms et al.

(10) Patent No.: US 10,095,320 B2
(45) Date of Patent: Oct. 9, 2018

(54) ACCESSORY AND CONTROL METHOD

(71) Applicant: HTC Corporation, Taoyuan (TW)

(72) Inventors: Hannes Jens Dieter Harms, San Francisco, CA (US); Daniel Hundt, San Francisco, CA (US); Michael Ross Massucco, San Francisco, CA (US); Gene Woo Nam, San Francisco, CA (US); Hsin-Hao Lee, Taoyuan (TW)

(73) Assignee: HTC Corporation, Taoyuan (TW)

( * ) Notice: Subject to any disclaimer, the term of this patent is extended or adjusted under 35 U.S.C. 154(b) by 53 days.

(21) Appl. No.: 14/690,485

(22) Filed: Apr. 20, 2015

(65) Prior Publication Data

US 2015/0316999 A1    Nov. 5, 2015

Related U.S. Application Data

(60) Provisional application No. 61/986,121, filed on Apr. 30, 2014.

(51) Int. Cl.
*A45C 11/00* (2006.01)
*A45C 13/10* (2006.01)
(Continued)

(52) U.S. Cl.
CPC .............. *G06F 3/023* (2013.01); *G06F 1/166* (2013.01); *G06F 3/017* (2013.01); *H04B 1/3888* (2013.01); *H04M 1/04* (2013.01); *H04M 1/185* (2013.01)

(58) Field of Classification Search
CPC .......... G06F 3/023; G06F 3/017; G06F 1/166; G06F 1/1615; G06F 1/1626; H04M 1/04;
(Continued)

(56) References Cited

U.S. PATENT DOCUMENTS 9,049,911 B1 *   6/2015   Wood .................... A45C 11/00
2010/0238620 A1   9/2010   Fish
(Continued)

FOREIGN PATENT DOCUMENTS

CN    103618821    3/2014
CN    103729026    4/2014

OTHER PUBLICATIONS

"Office Action of Europe Counterpart Application," dated Sep. 17, 2015, p. 1-p. 6.

(Continued)

*Primary Examiner* — Ibrahim A Khan
(74) *Attorney, Agent, or Firm* — JCIPRNET

(57) ABSTRACT

An accessory is provided for disposing on an electronic device, which has a plurality of device elements disposed adjacent to one edge of the electronic device. the accessory comprises a cover having a plurality of cover elements disposed in the cover. When one of the cover elements is not attached to the one of the device elements along the other edge of the electronic device, the cover is flipped along the one edge of the electronic device and the cover elements along the one edge attracted to the cover element along the corresponding edge of the cover. A control method is also provided for controlling an electronic device according to a movement of a portion of the accessory relative to the electronic device.

23 Claims, 17 Drawing Sheets

(51) Int. Cl.
*G06F 1/16* (2006.01)
*G06F 3/023* (2006.01)
*G06F 3/01* (2006.01)
*H04B 1/3888* (2015.01)
*H04M 1/04* (2006.01)
*H04M 1/18* (2006.01)

(58) Field of Classification Search
CPC .. H04M 1/185; H04B 1/3888; A45C 13/1069; A45C 2011/003
See application file for complete search history.

(56) References Cited

U.S. PATENT DOCUMENTS

| | | | | |
|---|---|---|---|---|
| 2012/0069540 A1* | 3/2012 | Lauder | ............... | G06F 1/1626 361/807 |
| 2012/0211613 A1* | 8/2012 | Yang | ............... | A45C 11/00 248/174 |
| 2012/0268911 A1 | 10/2012 | Lin | | |
| 2013/0063873 A1 | 3/2013 | Wodrich et al. | | |
| 2013/0076614 A1 | 3/2013 | Ive et al. | | |
| 2013/0322003 A1* | 12/2013 | Nakada | ............... | A45C 11/00 361/679.26 |
| 2014/0033482 A1* | 2/2014 | Fullerton | ............... | H01F 7/02 24/303 |
| 2014/0071606 A1* | 3/2014 | Bates | ............... | H01H 13/704 361/679.09 |
| 2014/0102924 A1* | 4/2014 | Chang | ............... | G06F 1/1633 206/320 |
| 2015/0108186 A1* | 4/2015 | Law | ............... | G03B 17/568 224/191 |

OTHER PUBLICATIONS

"Office Action of Taiwan Counterpart Application," dated May 25, 2017, p. 1-p. 9.

"Office Action of China Counterpart Application," dated Jun. 22, 2017, p. 1-p. 11.

* cited by examiner ured the electronic device and a relevant control method.

ACCESSORY AND CONTROL METHOD

CROSS-REFERENCE TO RELATED APPLICATION

This application claims the priority benefits of U.S. provisional application Ser. No. 61/986,121, filed on Apr. 30, 2014. The entirety of the above-mentioned patent application is hereby incorporated by reference herein and made a part of this specification.

BACKGROUND OF THE INVENTION

Field of the Invention

The application is related to an accessory, and more particularly, to an accessory applied in an electronic device and a relevant control method.

Description of Related Art

Typically, portable electronic devices are intended to be carried around or moved about in various environment. Therefore, these electronic devices are easily subject to dropped, crash, or scratched. Protective cover is used to protect these portable electronic devices from damage. The user needs a cover that can be used to enhance the functionality and capabilities of the electronic devices. Thus, there is a need for an accessory that can be utilized to accompany with the electronic device to satisfy different user behavior while at the same time enhance the functionality and usability of the devices.

SUMMARY OF THE INVENTION

The application is directed to an accessory for protecting an electronic device.

The application is directed to a control method for controlling an electronic device attached with an accessory.

The application provides an accessory suitable for disposing on an electronic device, which has a plurality of first device elements disposed adjacent to first and second edges of the electronic device, the accessory comprises a cover has a plurality of first cover elements disposed in the cover, at least one of the first cover elements attracted to at least one of the first device elements along each edge of the electronic device. When one of the first cover elements is not attached to the one of the first device elements along the first edge of the electronic device, the cover is flipped along the second edge of the electronic device and the first cover elements along the second edge attracted to the first cover element along the corresponding edge of the cover. When one of the first cover elements is not attached to the one of the first device elements along the second edge of the electronic device, the cover is flipped along the first edge of the electronic device and the first cover elements along the first edge attracted to the first device element along the corresponding edge of the cover.

The application provides an accessory suitable for disposing on an electronic device, which has a plurality of first device elements disposed adjacent to first and second edges of the electronic device. The accessory comprises a cover has a plurality of first cover elements disposed in the cover and adjacent to two edges of the cover, at least one of the first cover elements attracted to at least one of the first device elements along each edge of the electronic device.

The application provides a control method suitable for controlling an electronic device coupled with an accessory. The accessory has an element disposed on a corner portion of the accessory. The electronic device has a sensor for detecting the element. The control method comprises the following steps. The corner portion of the accessory is moved away from the electronic device is determined by detecting the element with the sensor in the electronic device. A function of the electronic device is triggered when the corner portion of the accessory is moved away from the electronic device.

To make the above features and advantages of the application more comprehensible, several embodiments accompanied with drawings are described in detail as follows.

DETAILED DESCRIPTION OF DISCLOSED EMBODIMENTS

Figure 1A:
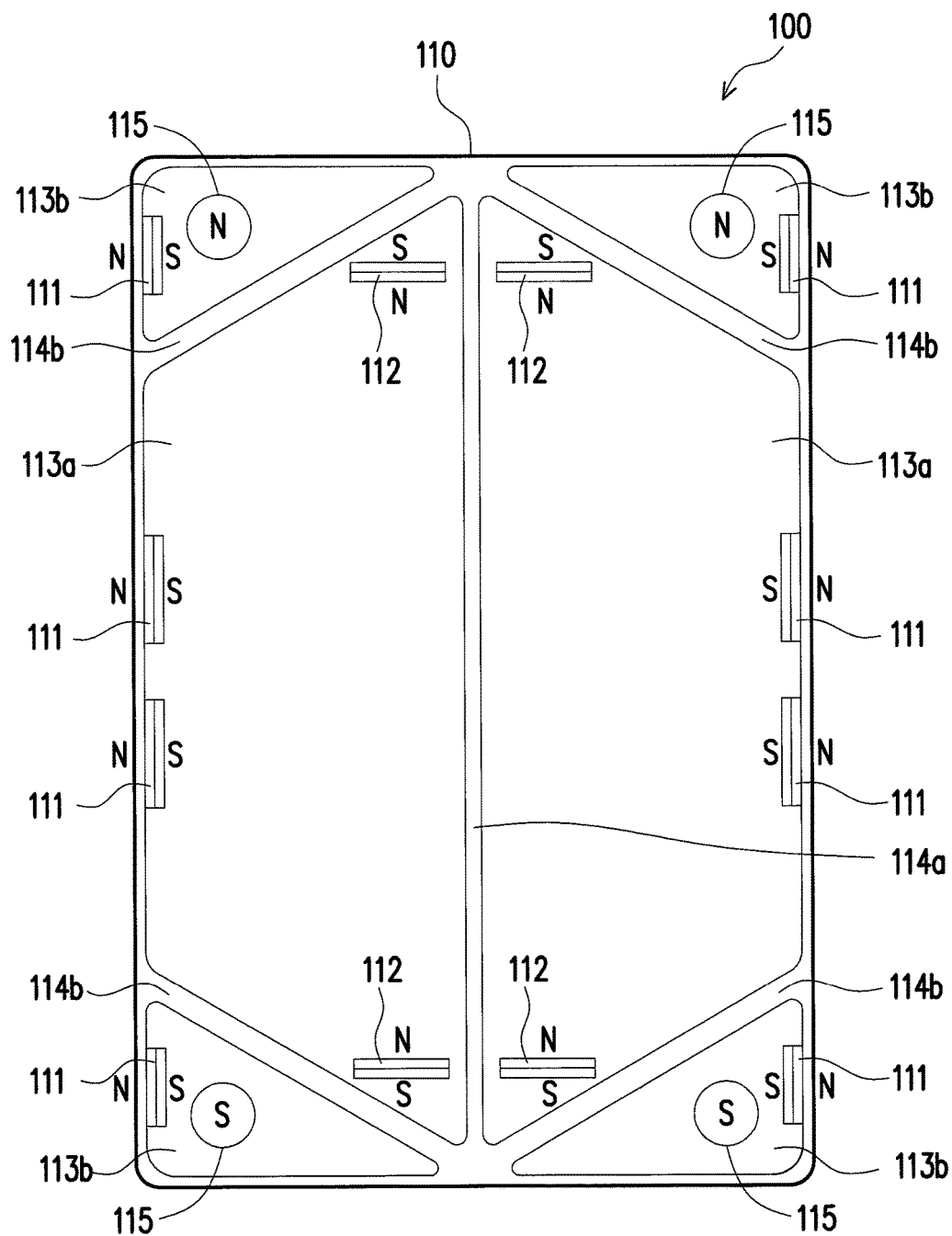
FIG. 1A is a schematic view of an accessory of an embodiment of the application.
Figure 1B:
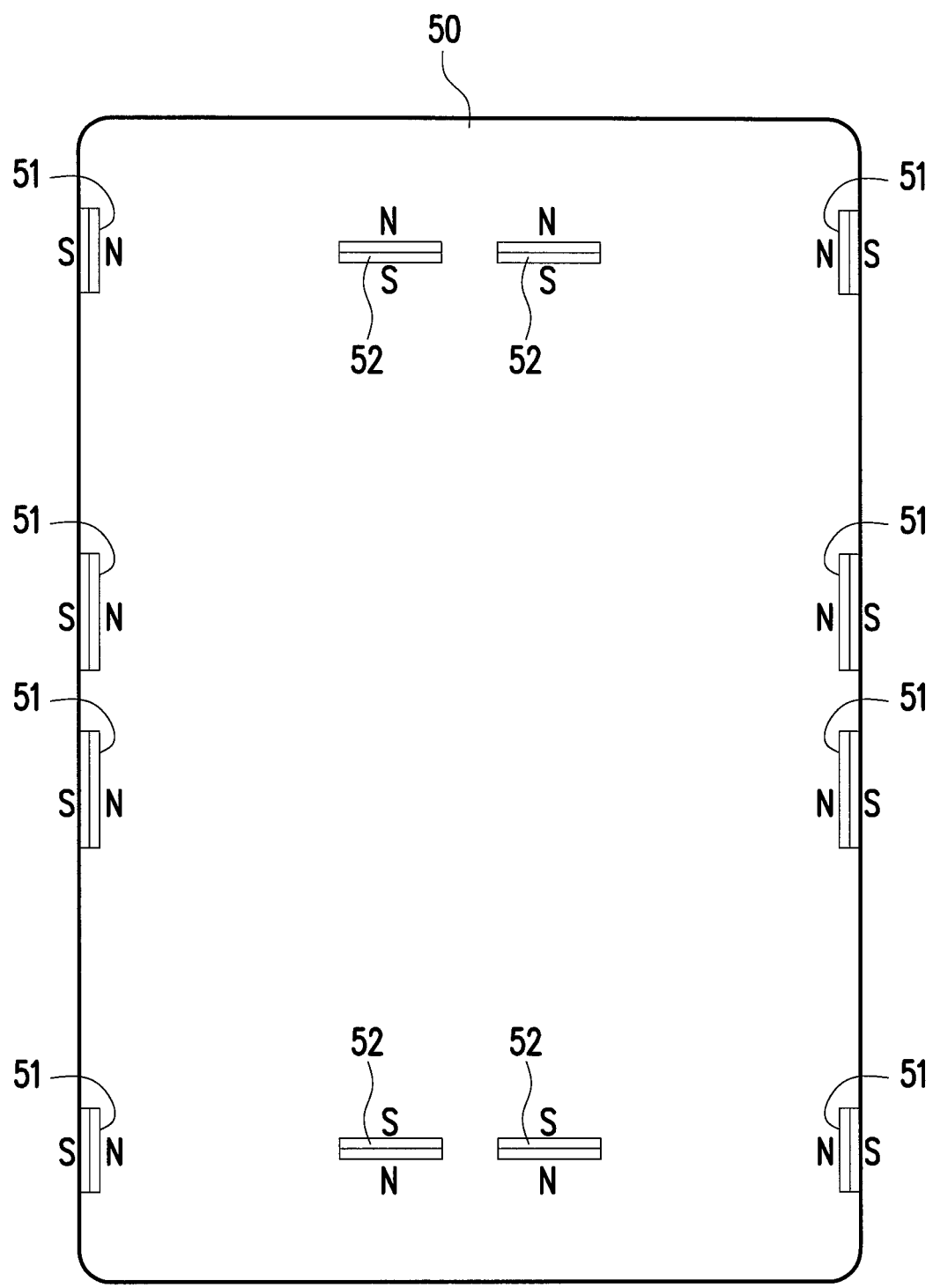
FIG. 1B is a schematic view of an electronic device suitable for the accessory in FIG. 1A.

Referring FIGS. 1A and 1B, an accessory 100 according to one embodiment of the application shown in FIG. 1A interacts with an electronic device 50 shown in FIG. 1B. The electronic device 50 may be a portable electronic device, tablet device, personal digital assistant, mobile phone, smart phone, or portable device with large screen. The accessory 100, which mechanically or physically separated from the electronic device 50, may be a cover 110, a case, or a back cover with edges or sides contour the edge of the electronic device 50. The cover 110 of the accessory 100 may be disposed on the electronic device 50. The electronic device 50 may comprise a display and a housing respectively at a front side and a rear side of the electronic device 50. The cover 110 may be placed on a front side of the electronic device 50 to cover the display of the electronic device 50. Alternatively, the cover 110 may be disposed on the rear side of the electronic device 50 to cover the housing.

The cover 110 has a plurality of first cover elements 111 disposed in or on the cover 110. The first cover element 111 may interact with magnetic field or produce magnetic field, such as permanent magnet, electromagnet, ferromagnetic materials, magnetic element or combination of magnet with different polarities. The electronic device 50 has a plurality of first device elements 51 disposed in or on the electronic device 50. The first device element 51 may interact with magnetic field or produce magnetic field, such as permanent magnet, electromagnet, ferromagnetic materials, magnetic element or combination of magnet with different polarities. The placement of the first cover elements 111 in the cover 110 forms a symmetrical pattern. The first device elements 51 in the electronic device 50 also forms a symmetrical pattern. The first device elements 51 and the first cover elements 111 are placed so that when a user flips the cover 110 from one of the edges of the electronic device 50, the first cover elements 111 at the edge of the cover 110 are attached to the corresponding edge of the electronic device 50. The attraction between the first cover elements 111 and the corresponding first device elements 51 is kept continuously.

In the embodiment, the electronic device 50 is substantially rectangular-plate-shaped, and the first device elements 51 are disposed adjacent to two edges of the electronic device 50. The cover 110 is substantially rectangular-plate-shaped similar to the electronic device 50, and the first cover elements 111 are disposed in the cover 110 and adjacent to two edges of the cover 110. Referring FIGS. 2A to 2C, when the cover 110 is flipped from the front side of the electronic device 50 to the rear side of the electronic device 50 along one of the edges of the electronic device 50 and the corresponding edge of the cover 110, the attraction between the first cover elements 111 and the corresponding first device elements 51 is kept continuously. Then, referring FIGS. 2A to 2C, when the cover 110 is flipped from the rear side of the electronic device 50 to the front side of the electronic device 50 along another edge of the electronic device 50 and another edge of the cover 110, the attraction between the first cover elements 111 and the corresponding first device elements 51 is also kept continuously. The order of flipping movement from FIGS. 2A to 2E may be reversed from FIGS. 2E to 2A.

Figure 2A:
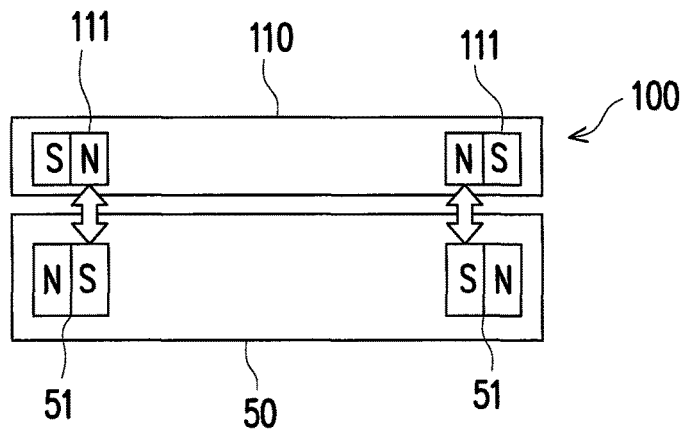
FIGS. 2A to 2E illustrate the accessory in FIG. 1A flipped around the electronic device in FIG. 1B.
Figure 2B:
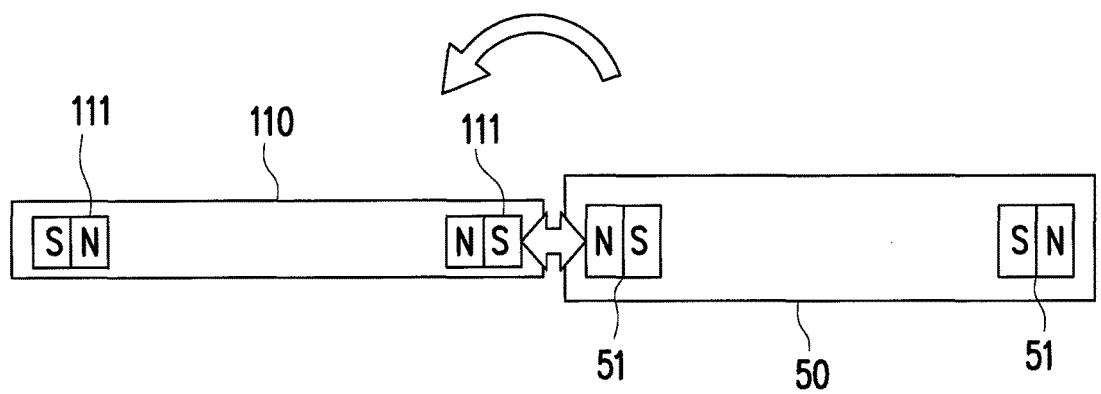
Figure 2C:
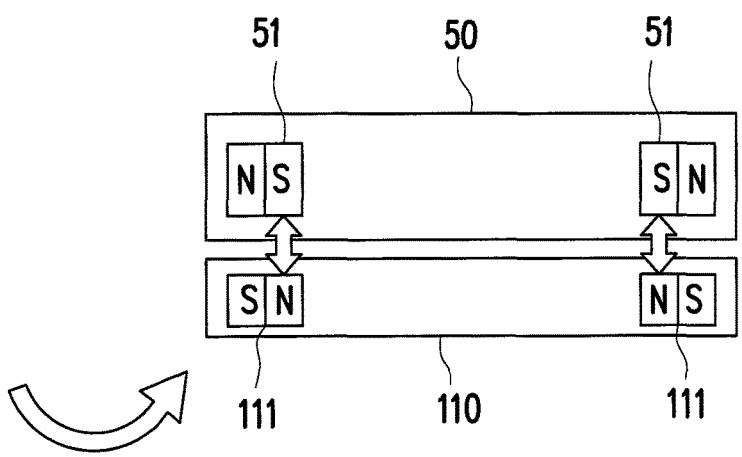
Figure 2D:
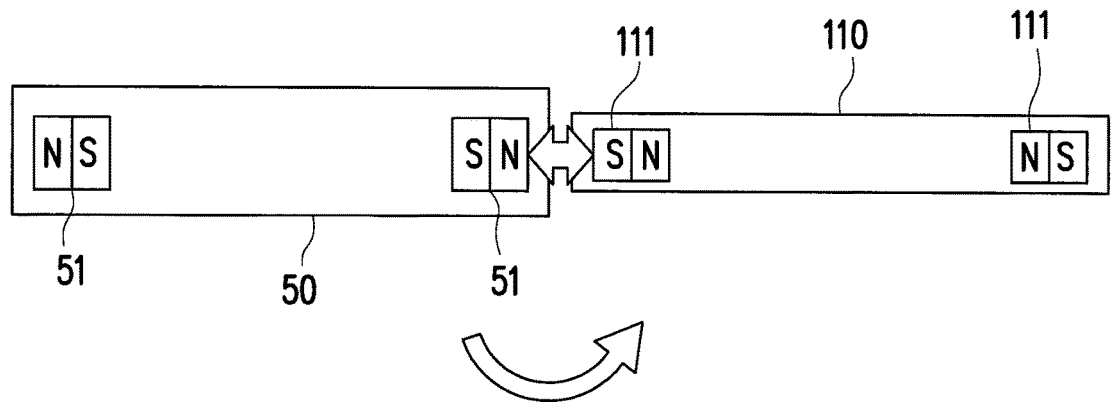
Figure 2E:
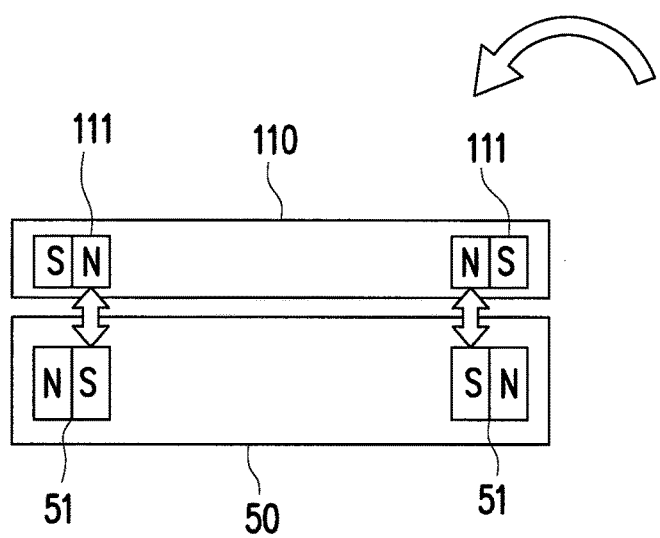

Referring FIGS. 1A and 1B again, in the embodiment, the electronic device 50 has a plurality of second device elements 52 substantially located at the rear side of the electronic device 50 and away from the edges of the electronic device 50. The cover 110 has a plurality of second cover elements 112 substantially located in the middle portions 113a away from the edges of the cover 110. The second cover elements 112 are aligned to the second device elements 52 respectively so as to attract the second device elements 52 respectively. The second device elements 52 and the second cover elements 112 provides additional attraction away from the edges of the electronic device 50 and the cover 110 so that the entire of the cover 110 may be closely attached to the electronic device 50 as shown in FIG. 2A, FIG. 2C or FIG. 2E.

Referring FIGS. 1A and 1B again, the cover 110 has two middle portions 113a and four corner portions 113b. The middle portions 113a may be substantially trapezoid-plate-shaped, and the corner portions 113b are substantially triangle-plate-shaped. The middle portions 113a may be bended, twisted, turned or arched to point to a different direction relative to each other via a central flexible portion 114a of the cover 110. For example, the middle portions 113a may be turned via a second trapezoid portion to form a 0 to 360-degree angle related to each other. Each of the corner portions 113b may be bended, twisted, turned or arched to point to a different direction relative to the corresponding middle portion 113a via an inclined flexible portion 114b of the cover 110. For example, the corner portion 113b may be turned via the corresponding inclined flexible portion 114b to form a 0 to 360-degree angle related to the corresponding middle portions 113a.

Figure 3A:
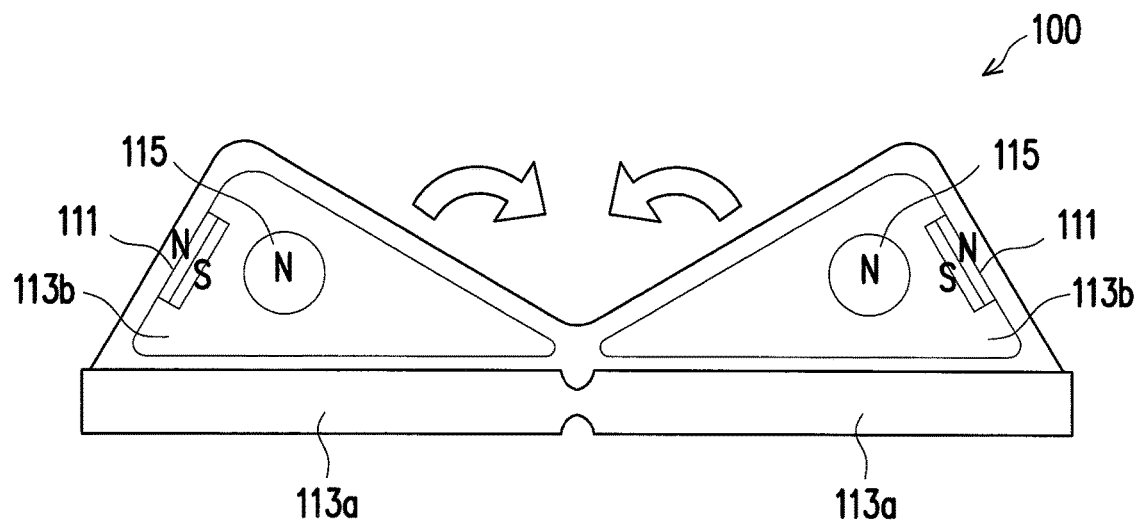
FIGS. 3A and 3B illustrate the accessory forming a triangular prism.
Figure 3B:
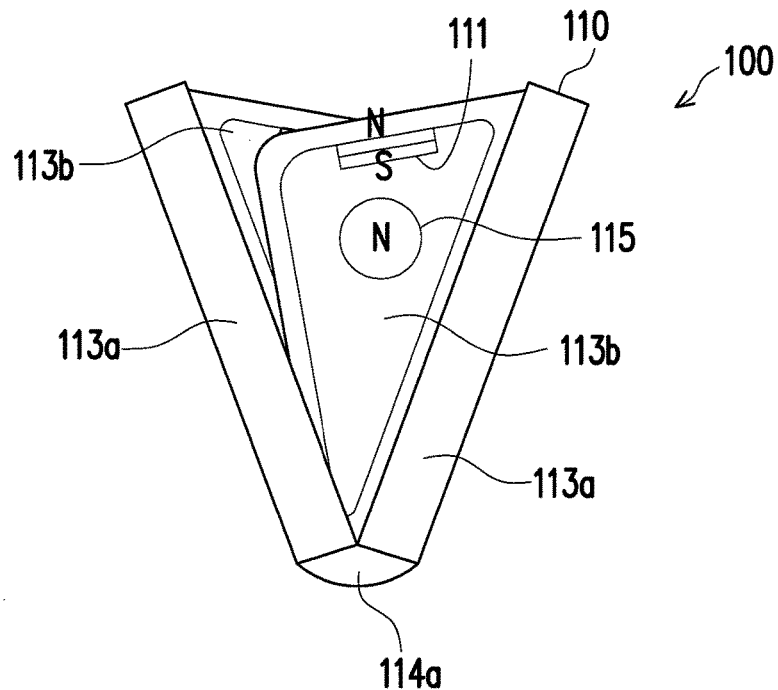
Figure 4A:
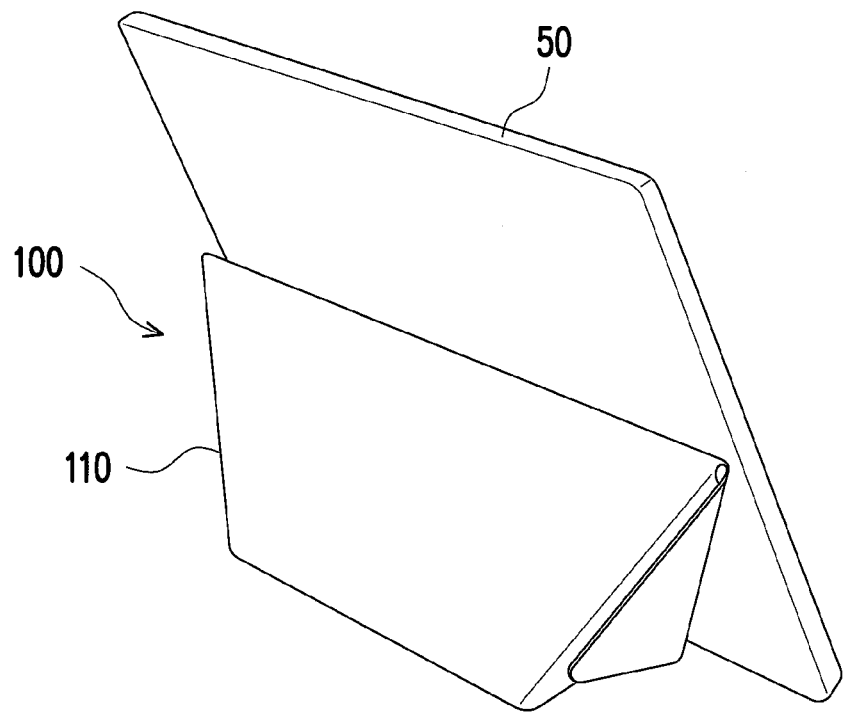
FIGS. 4A and 4B illustrate the accessory of triangular shape in FIG. 2B used to tilt the electronic device in different angles respectively.
Figure 4B:
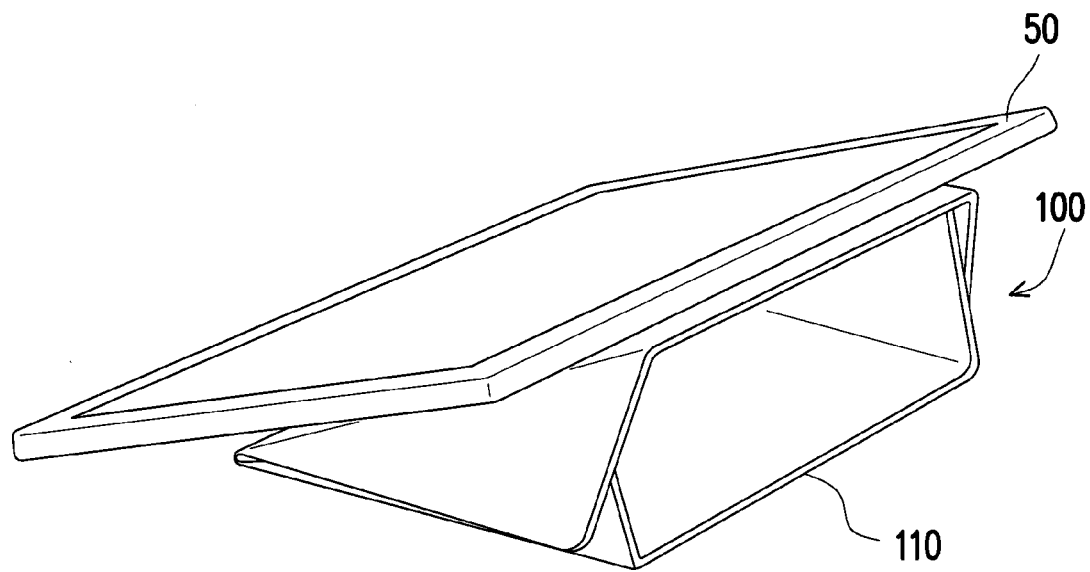

Referring FIGS. 1A and 3A to 3B, in the embodiment, the cover 110 has a plurality of shaping elements 115 embedded in the corner portions 113b respectively, and when the middle portions 113a are bended relative to each other and a neighbor two of the corner portions 113b are overlapped each other, the shaping elements 115, located in the neighbor two of the corner portions 113b respectively, attract each other so that the cover. 110 may be kept in a shape of triangular prism to form a stand. When the cover 110 is kept in a shape of triangular prism, the cover 110 may be attached to the electronic device 50 by attraction and also tilt the electronic device 50 in different states respectively on a table or the like as shown in FIGS. 4A and 4B.

All of the elements list above may be a permanent magnet, electric magnet, or any element that may interact with magnetic field or electric field, such as metal, or polar material. The element may be combination of a plurality of magnets. A shielding may be disposed on the element or between the magnets in the element for shielding the magnetic field in a defined direction or reduce the magnetic flux to an acceptable level so the component in the electronic device 50 may not be affected. A conductor or magnetic guide maybe placed on the element or between the magnets in the element to guide the magnetic field to a defined direction or forming a defined magnetic field.

Figure 5:
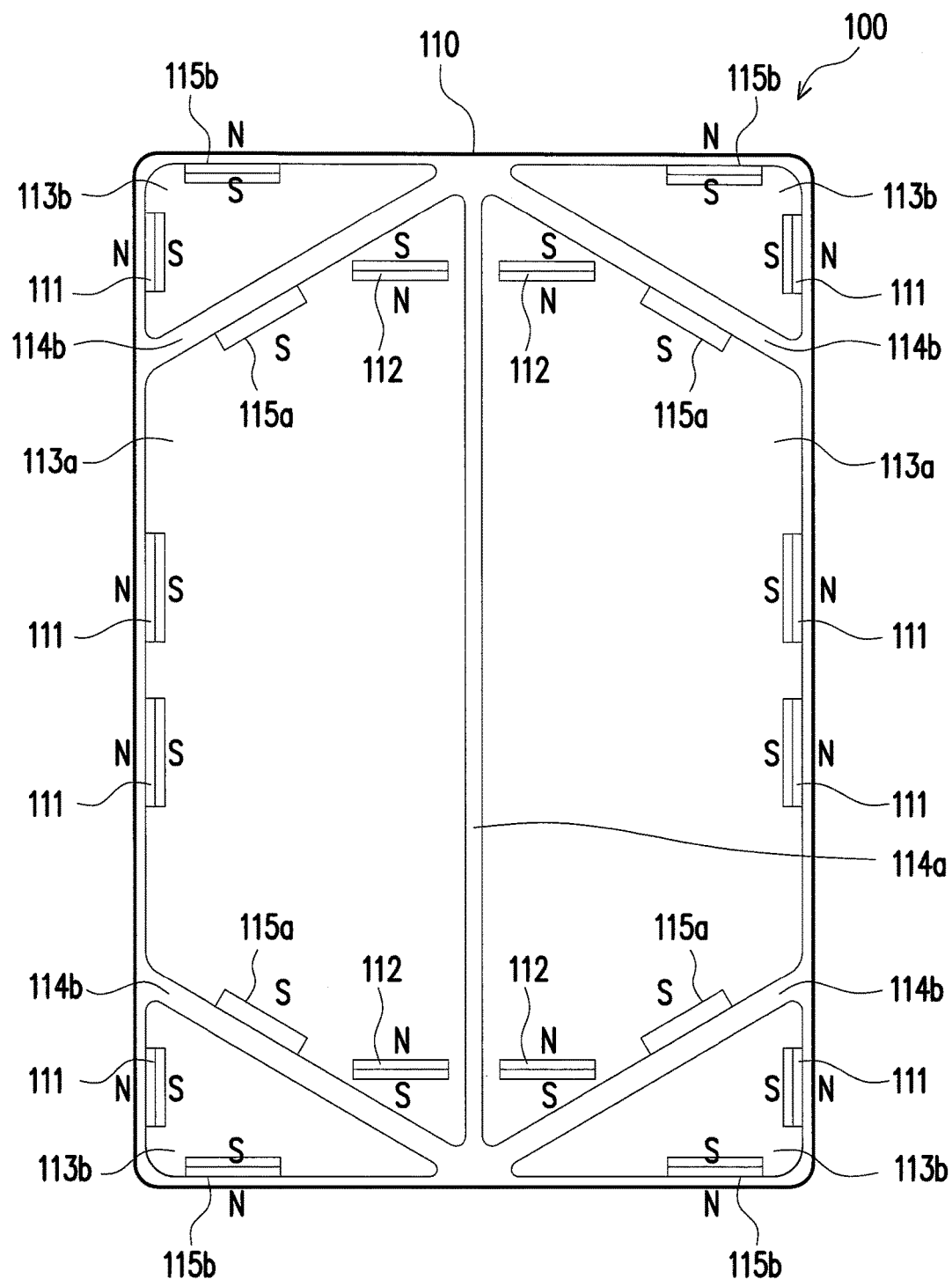
FIG. 5 is a schematic view of an accessory of another embodiment of the application.
Figure 6A:
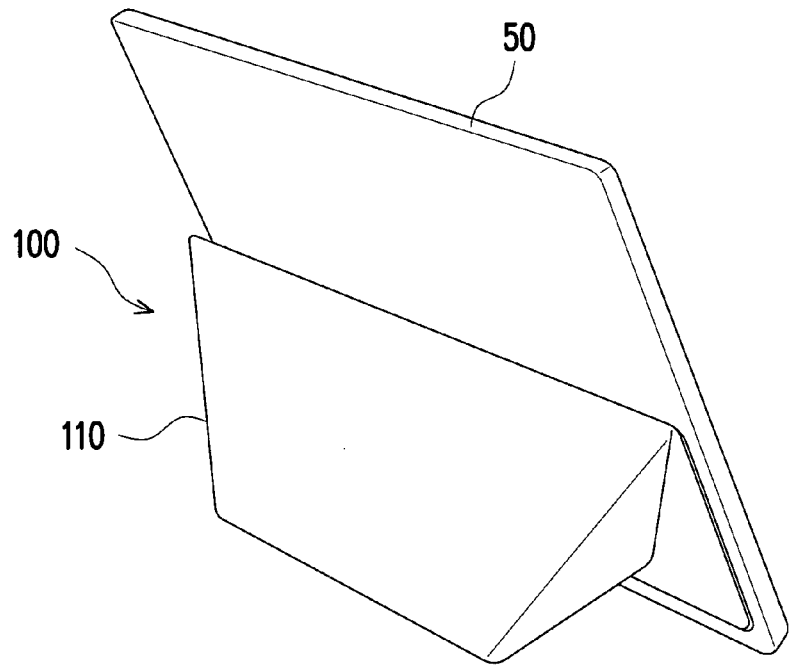
FIGS. 6A and 6B illustrate the accessory of triangular shape in FIG. 5 used to tilt the electronic device in FIG. 1B in different angles respectively.
Figure 6B:
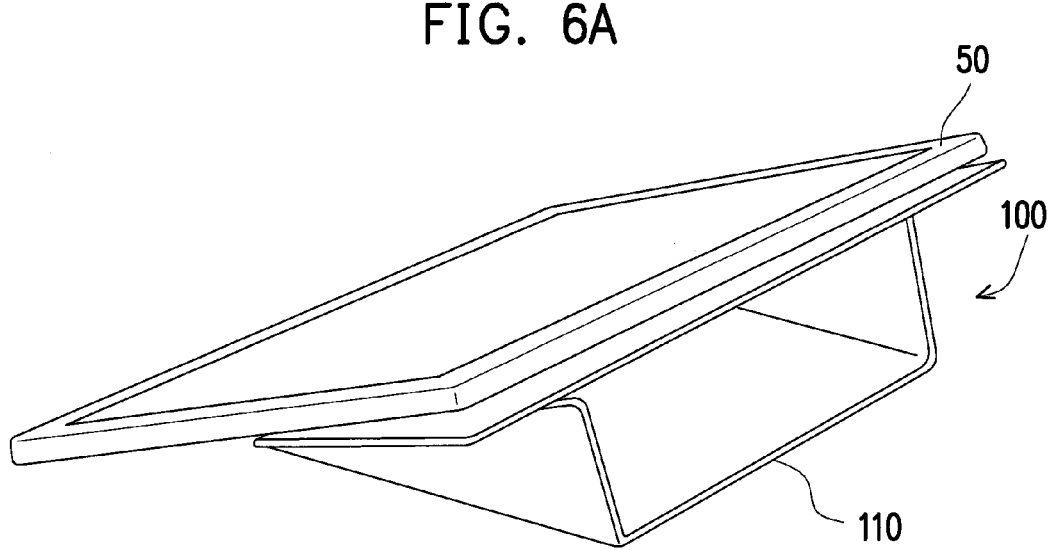

Referring FIG. 5, different from the accessory 100 in FIG. 1A, the accessory 100 in FIG. 5 has a different way to kept the shape thereof so as to stand the electronic device 50 in FIG. 1A. In brief, the cover 110 of the accessory 100 in FIG. 5 has a plurality of first shaping elements 115a embedded in the middle portions 113a respectively and a plurality of second shaping elements 115b embedded in the corner portions 113b respectively, and when the middle portions 113a are bended relative to each other and two of the corner portions 113b are overlapped each other and contact the middle portion 113a respectively, the first shaping elements 115a attract the second shaping elements 115b respectively so that the cover 110 in FIG. 5 may form a stand. Therefore, the cover 110 in FIG. 5 may be attached to the electronic device 50 by attraction and also tilt the electronic device 50 in different states respectively on a table or the like as shown in FIGS. 6A and 6B.

Figure 7:
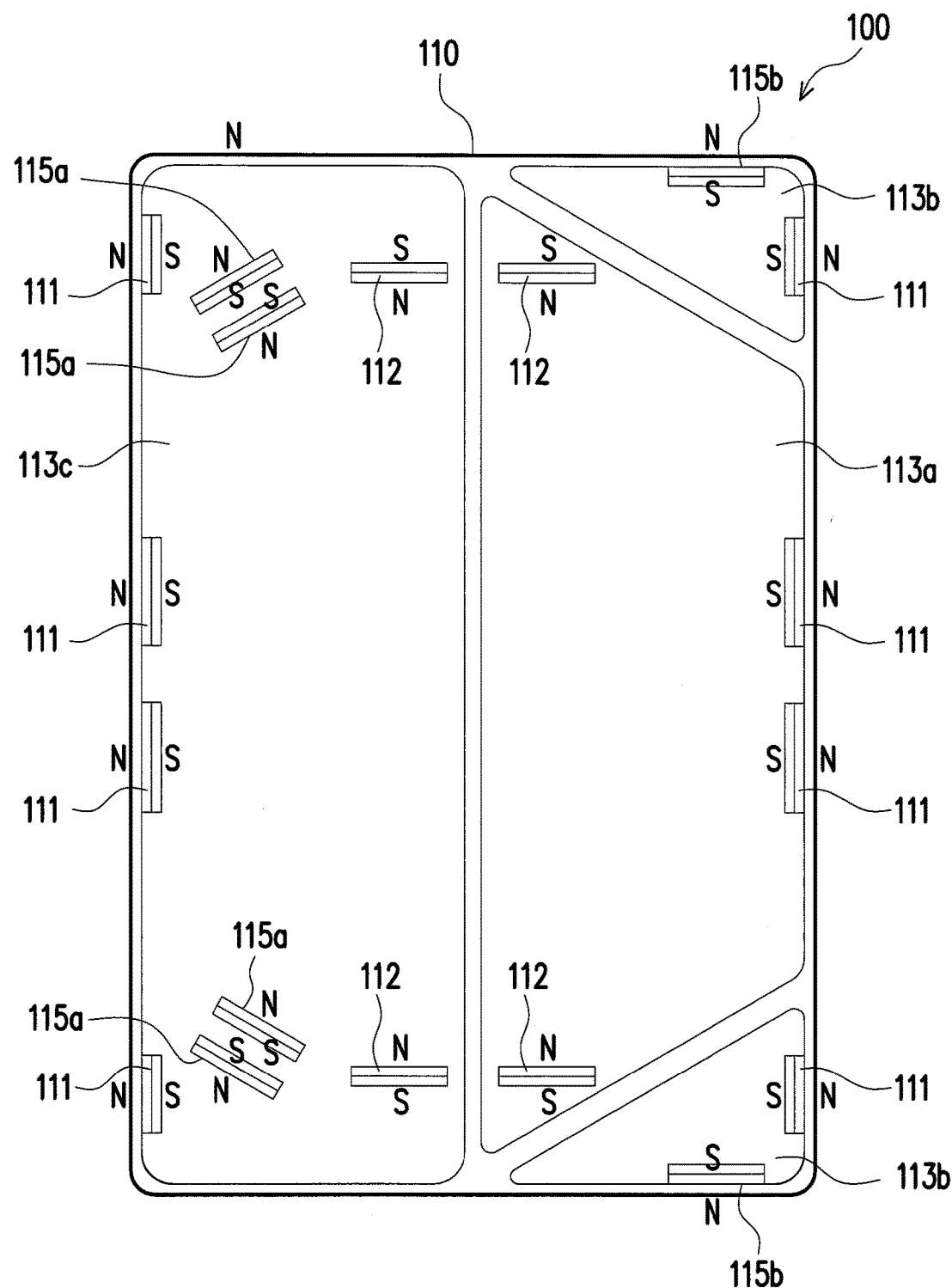
FIG. 7 is a schematic view of an accessory of another embodiment of the application.

Referring FIG. 7, different from the accessory 100a in FIG. 1A, the cover 110 of the accessory 100 in FIG. 7 has a half portion 113c to replace a side thereof, and has two pairs of second shaping elements 115b in the half portion 113c. Specifically, the half portion 113c is substantially rectangular-plate-shaped and is able to be bended relative to the middle portion 113a via a central flexible portion 114a. The second cover elements 112 substantially located in the half portion 113c and the middle portion 113a away from the edges of the cover 110 in FIG. 7 to attract the second device elements 52 of the electronic device 50 in FIG. 1B respectively. Each of the pairs of second shaping elements 115b are placed in parallel with south pole of both the second shaping elements 115b facing each other.

Figure 8A:
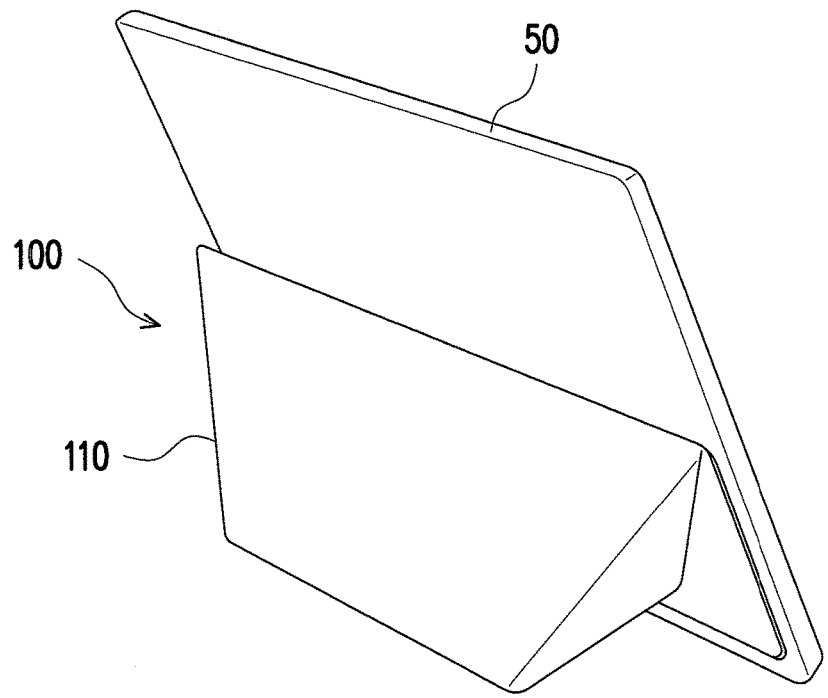
FIGS. 8A and 8B illustrate the accessory of triangular shape in FIG. 7 used to tilt the electronic device in FIG. 1B in different angles respectively.
Figure 8B:
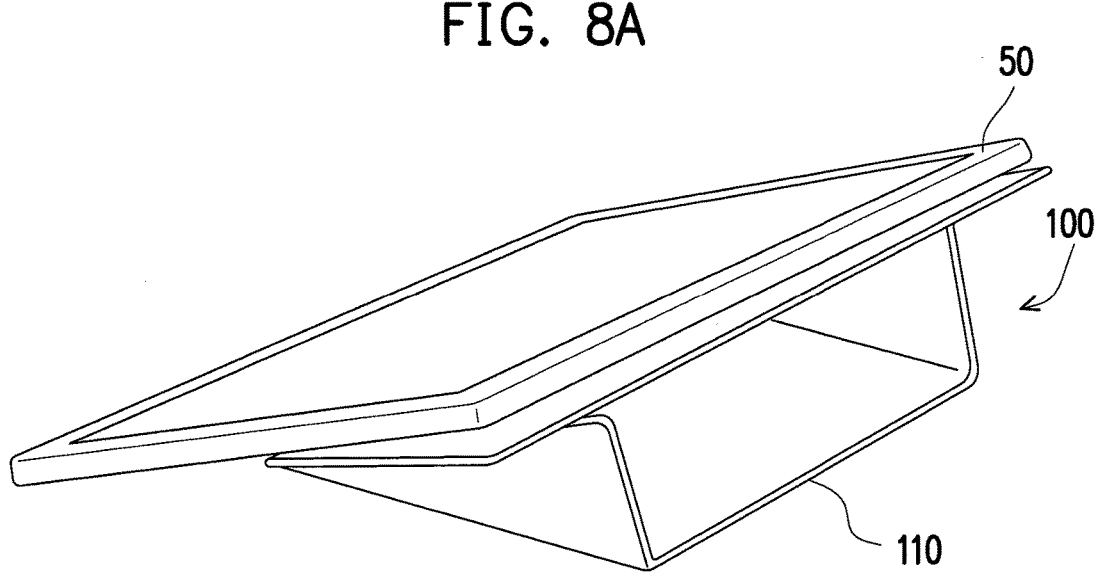

When the half portion 113c and the middle portion 113a are bended relative to each other and the corner portions 113b contact the half portion 113c, the first shaping elements 115a in the corner portions 112a may be attached to the space between the corresponding pair of the second shaping elements 115b. The north pole of the first shaping elements 115a is attracted by the two south poles of the corresponding pair of the second shaping elements 115b so that the cover 110 in FIG. 7 may form a stand. Therefore, the cover 110 in FIG. 7 may be attached to the electronic device 50 by attraction and also tilt the electronic device 50 in different states respectively on a table or the like as shown in FIGS. 8A and 8B.

Figure 9:
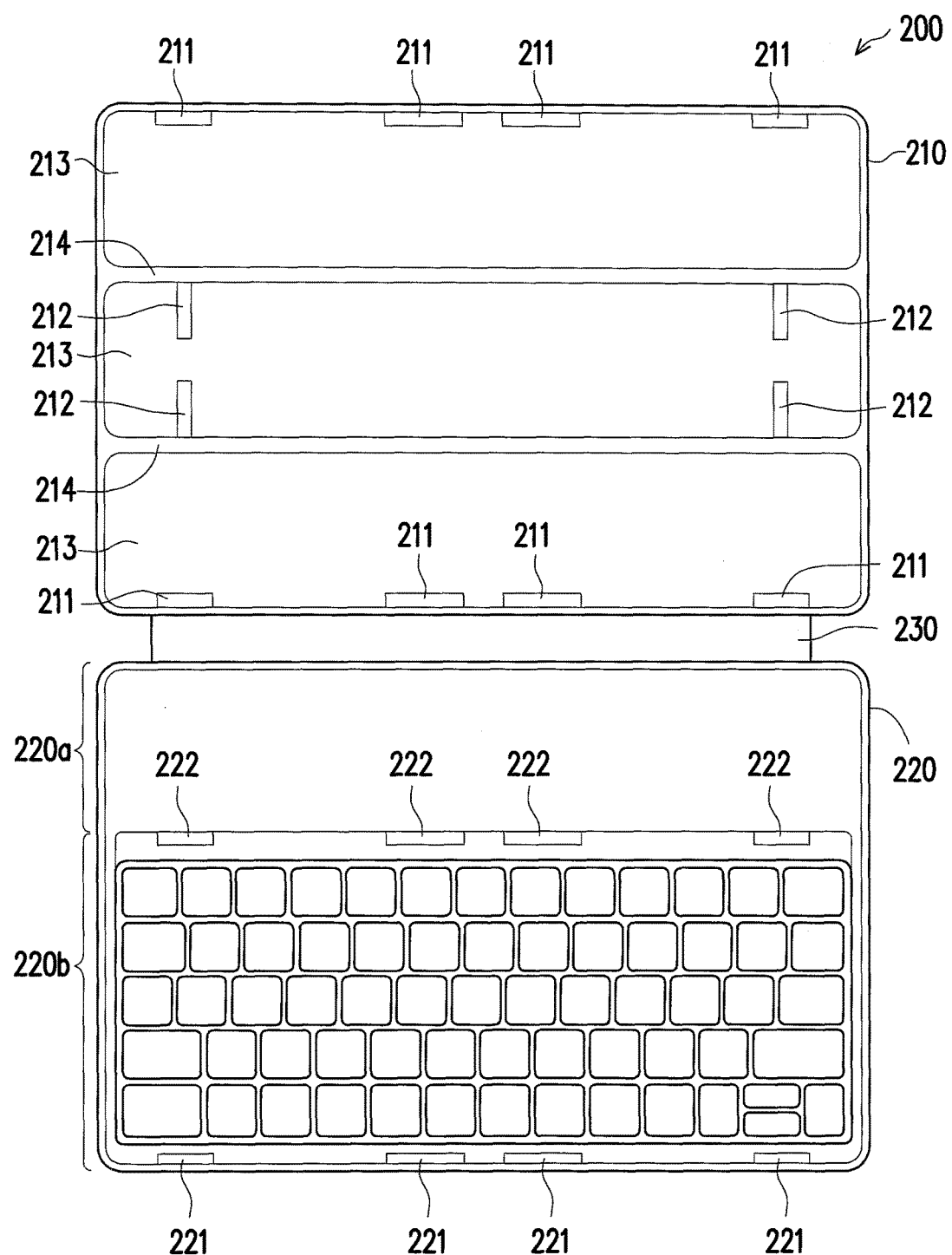
FIG. 9 is a schematic view of an accessory of another embodiment of the application.
Figure 10A:
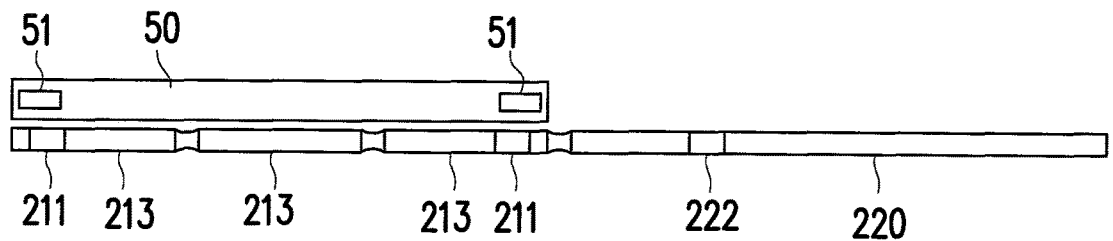
FIGS. 10A to 10F illustrate the accessory in FIG. 8A in various folding state relative to the electronic device in FIG. 1B respectively.
Figure 10B:
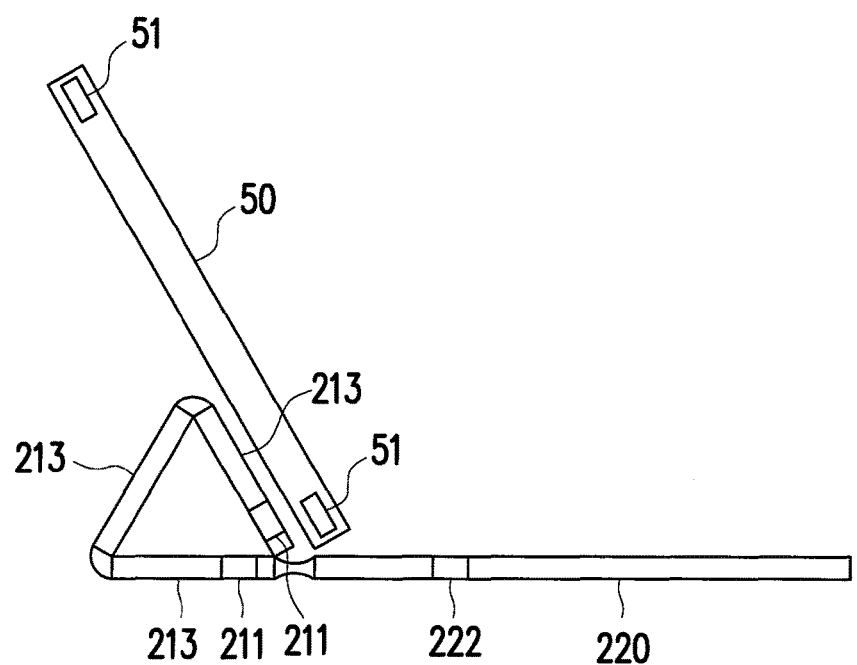
Figure 10C:
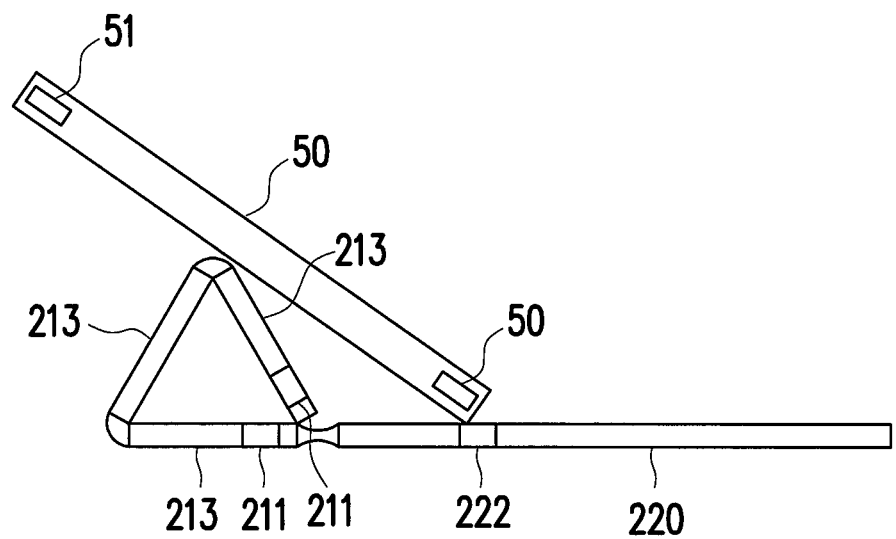
Figure 10D:
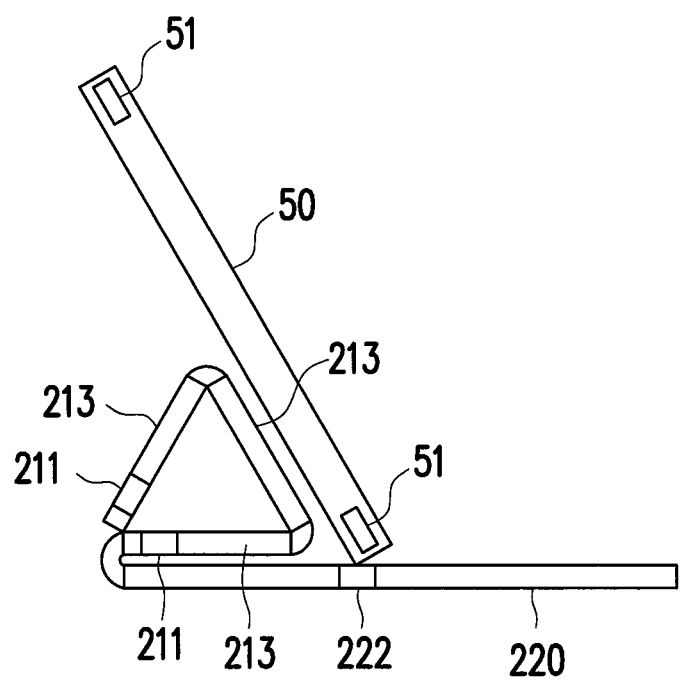
Figure 10E:
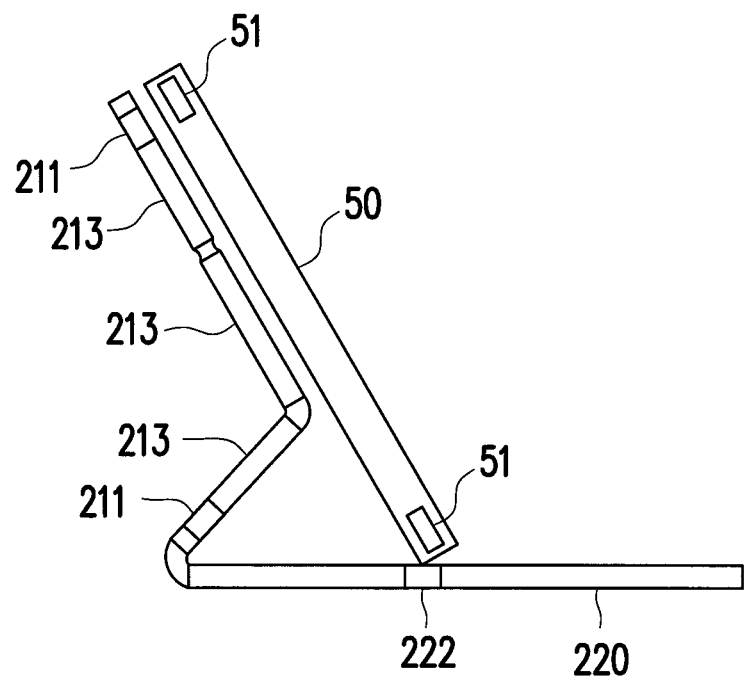
Figure 10F:
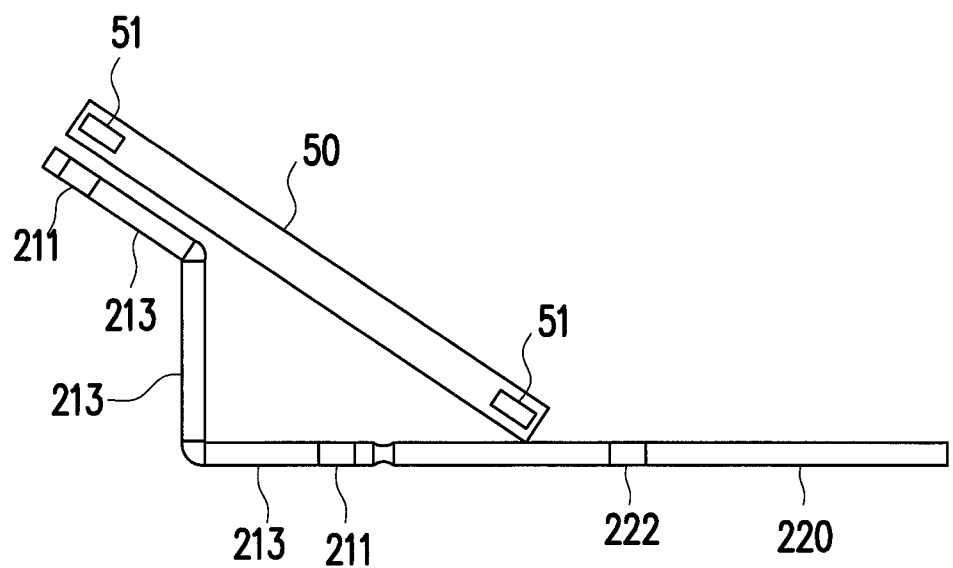

Please refer to FIG. 9 for another embodiment of present application. The accessory 200 is also suitable for the electronic device 50 in FIG. 1B and may further comprise a cover 210 and a keyboard 220, and the keyboard 220 flexibly connected to one of the edges of the cover 210 via a flexible portion 230. The cover 210 has a plurality of segments 213 arranged side by side in sequence, and any adjacent two of the segments 211 are able to be bended relative to each other via a flexible portion 214 which is substantially parallel to the edges of the cover 210. Similar to the cover 110 in FIG. 1A, the cover 210 in FIG. 9 also has first cover elements 211. The first device elements 51 and the first cover elements 211 are placed so that when a user flips the cover 210 from one of the edges of the electronic device 50, the first cover elements 211 at the edge of the cover 210 are attached to the corresponding edge of the electronic device 50. The attraction between the first cover elements 211 and the corresponding first device elements 51 is kept continuously.

Referring FIG. 9, the cover 210 has a plurality of second cover elements 212 substantially located in one or ones of the segments 213 away from the edges of the cover 210. The second cover elements 212 are aligned to the second device elements 52 respectively so as to attract the second device elements 52 respectively. The second device elements 52 and the second cover elements 212 provides additional attraction away from the edges of the electronic device 50 and the cover 210 so that the entire of the cover 210 may be closely attached to the electronic device 50.

Referring FIG. 9, the keyboard 220 is substantially rectangular-plate-shaped similar to the cover 210, one edge of the keyboard 220 is flexibly connected to the corresponding edge of the cover 210, and the keyboard 220 has a plurality of first keyboard elements 221 embedded in the keyboard 220 adjacent to the other edge of the keyboard 220 away from the cover 210. The keyboard 220 has a plurality of second keyboard elements 222 embedded in the keyboard 220 and between the edges of the keyboard 220. The keyboard 220 has a margin region 220a and a keyboard region 220b adjacent to the margin region 220a, the second keyboard elements 222 are between the margin region 220a and the keyboard region 220b. Therefore, as shown in FIGS. 10A to 10F, the electronic device 50 has different folding position of the cover 210. The segments 213 may be folded along the flexible portion 230.

Figure 11A:
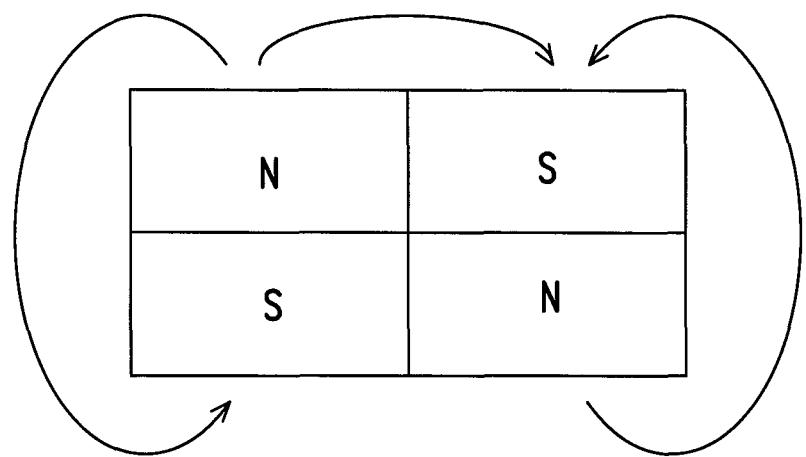
FIGS. 11A and 11B illustrate magnet combinations used in the above embodiments.
Figure 11B:
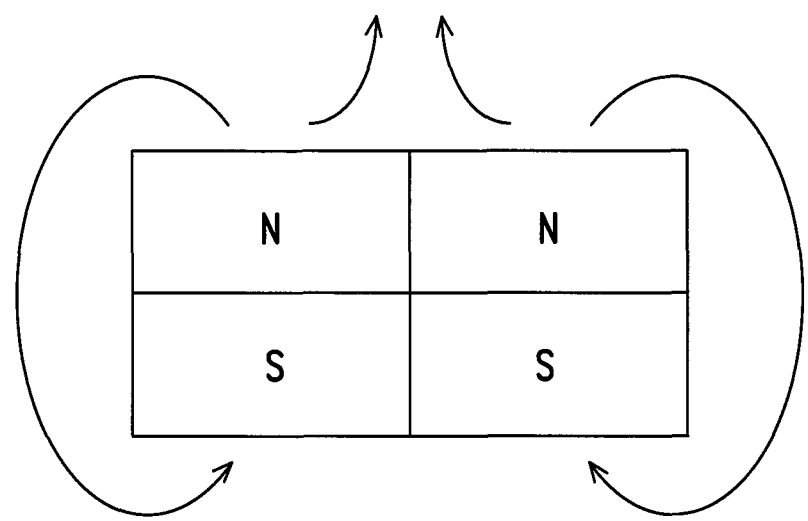

Please refer to FIGS. 11A and 11B for the magnet combination. The element that is placed inside of the electronic device 50 or the cover 110 or 210 mentioned above may have combine different magnet to achieve best magnetic strength between electronic device 50 and the cover 110 or 210. For example, the second device elements 52 and the second cover elements 112 or 212 are combination of magnets. By placing two magnets together with opposite side of pole together, the magnetic field strength of the combined magnet at center of combination is stronger than just a single magnet. By placing two magnets together with same side of magnetic pole together, the magnetic field strength of the combined magnet at center of combination is stronger than just a single magnet.

Figure 12A:
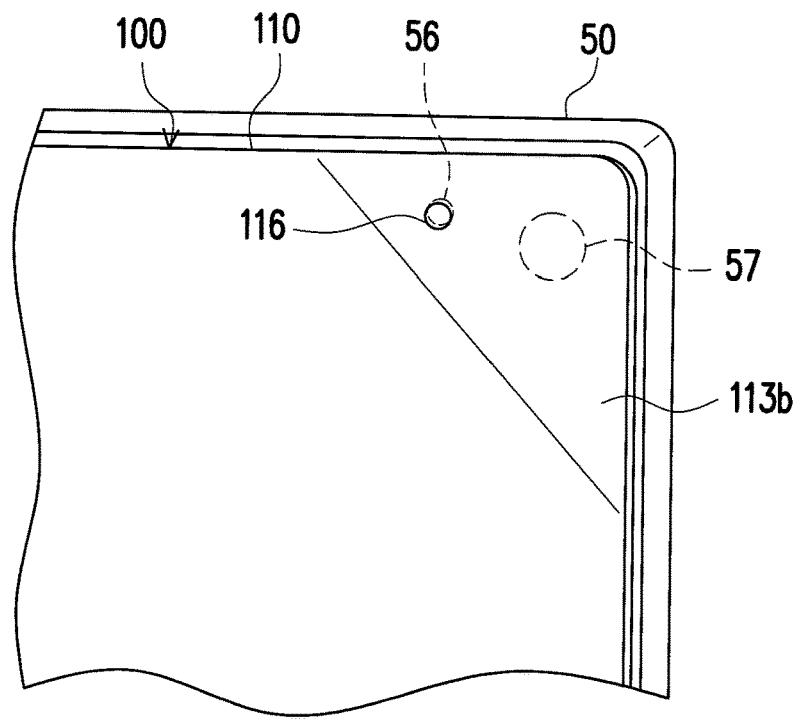
FIGS. 12A and 12B illustrate a control method according to another embodiment of the application.
Figure 12B:
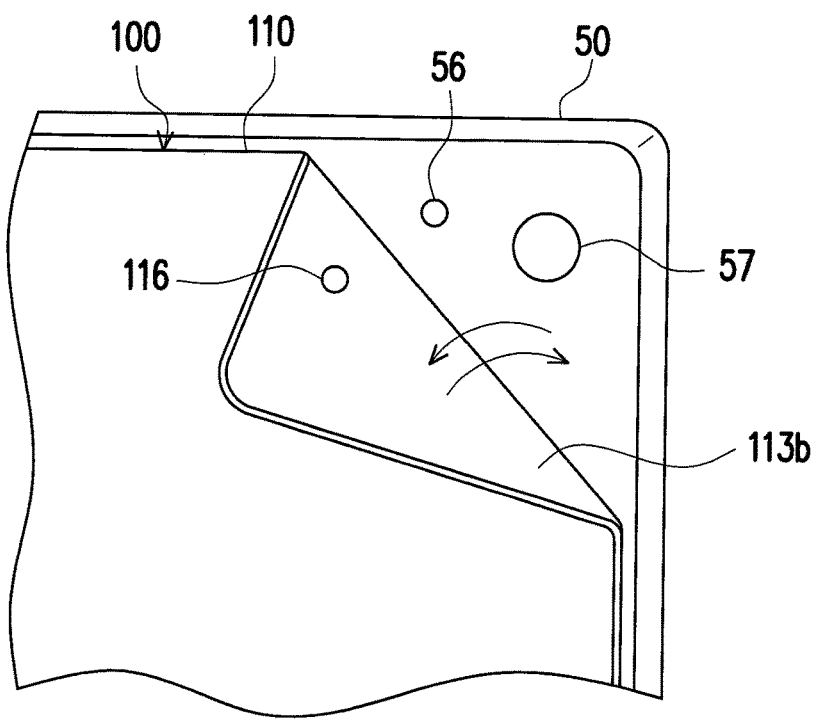

Please refer to FIGS. 12A and 12B for a control method that may be suitable for controlling the electronic device 50 in FIG. 1B coupled with an accessory in FIG. 1A. By detecting an element 116 (such as a magnet) disposed on a corner portion 113b of the accessory 100 by a sensor 56 (such as a hall sensor) in the electronic device 50, the corner portion 113b of the accessory 100 is moved away from the electronic device 50 can be determined. When the corner portion 113b of the accessory 100 is moved away from the electronic device 50, a function of the electronic device 50 is triggered.

In this embodiment shown in FIGS. 12A and 12B, the electronic device 50 has a camera 57 at a corner of a rear side of the electronic device 50, the corner portion 113b of the cover 110 of the accessory 100 is originally attached on the rear side of the electronic device 50 and the corner portion 113b covers the camera 57 shown in FIG. 12A and is able to be folded to expose the camera 57, and the element 130 in the corner portion 113b is detected by the sensor 56 of the electronic device 50. Therefore, when the corner potion 113b is folded by a user to expose the camera 57, the sensor 56 of the electronic device 50 may detect the element 116 is moved away from the sensor 56, and thus the camera function of the electronic device 50 is activated or triggered. On the contrary, when the corner potion 113b covers the camera 57 again, the sensor 56 of the electronic device 50 may detect the element 116 is moved close to the sensor 56, and thus the camera function of the electronic device 50 is inactivated.

Figure 13A:
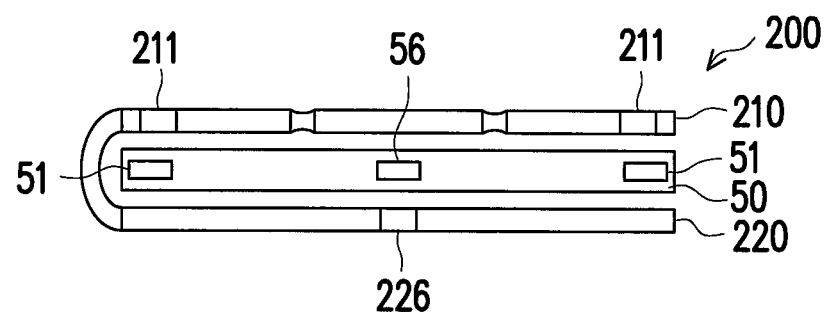
FIGS. 13A and 13B illustrate a control method according to another embodiment of the application.
Figure 13B:
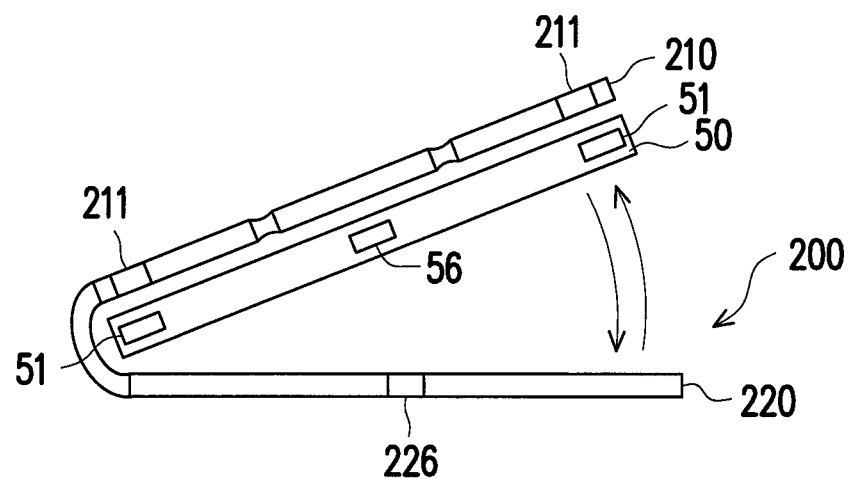

In another embodiment shown in FIGS. 13A and 13B, the electronic device 50 in FIG. 1B and the accessory 200 in FIG. 9 are applied here. The element 226 (such as a magnet) is located in the keyboard 220 of the accessory 200, and the sensor 56 (such as a hall sensor) is located in the electronic device 50. In an initial state shown in FIG. 13A, the electronic device 50 is originally sandwiched between the cover 210 and the keyboard 220. When the electronic device 50 attached with the cover 210 is moved away from the keyboard 220, the sensor 56 of the electronic device 50 may detect the element 226 is moved away from the sensor 56, and thus a function of the electronic device 50 is activated or triggered, such as the display of the electronic device 50 is turned on. On the contrary, when the electronic device 50 attached with the cover 210 is stacked on the keyboard 220 again, the sensor 56 of the electronic device 50 may detect the element 226 is moved close to the sensor 56, and thus the function of the electronic device 50 is inactivated, such as the display of the electronic device 50 is turned off.

Although the application has been described with reference to the above embodiments, it will be apparent to one of the ordinary skill in the art that modifications and variations to the described embodiments may be made without departing from the spirit and scope of the application. Accordingly, the scope of the application will be defined by the attached claims not by the above detailed descriptions.

What is claimed is:
1. An accessory suitable for disposing on an electronic device, which has a plurality of first device elements disposed adjacent to first and second edges of the electronic device, the accessory comprising:
 a cover has a plurality of first cover elements disposed in the cover, at least one of the first cover elements attracted to at least one of the first device elements along each edge of the electronic device;

wherein when one of the first cover elements is not attached to the one of the first device elements along the first edge of the electronic device, the cover is flipped along the second edge of the electronic device and the first cover elements along the second edge are attracted to the first device element along the corresponding edge of the cover, and when one of the first cover elements is not attached to the one of the first device elements along the second edge of the electronic device, the cover is flipped along the first edge of the electronic device and the first cover elements along the first edge are attracted to the first device element along the corresponding edge of the cover, wherein when the first cover element and the corresponding first device element are two magnets attracted to each other, a north pole and a south pole of the first cover element are arranged in a first axis which is parallel to the cover and perpendicular to edges of the cover corresponding to the first and the second edges of the electronic device, a north pole and a south pole of the first device element are arranged in a second axis which is opposite to the first axis, parallel to the cover, and perpendicular to the first and the second edges of the electronic device, wherein magnetic polarities of the first cover elements facing the edges of the cover are the same, wherein the placement of the first cover elements in the cover forms a symmetrical pattern respect to a third axis which is parallel to the first edge and goes through a geometrical center of the cover and a fourth axis which is parallel to the second edge and goes through the geometrical center of the cover, wherein the cover has a front surface and a rear surface opposite to each other and parallel to the first axis, and a distance between the first axis and the front surface is equal to a distance between the first axis and the rear surface, wherein when the cover is flipped, an attraction between the first cover element and the corresponding first device element is kept and one of the first and second edges of the electronic device is tightly attached to corresponding edge of the cover, and wherein the cover is able to rotate 360 degrees about each of the first and second edges of the electronic device.

2. The accessory as claimed in claim 1, wherein the electronic device has a front side with a display thereat and a rear side, and the cover is flipped from the rear side to the front side.

3. The accessory as claimed in claim 1, wherein the electronic device has a front side with a display thereat and a rear side, and the cover is flipped to the rear side for a first mode and flipped to the front side for a second mode.

4. The accessory as claimed in claim 1, wherein the cover has two middle portions and four corner portions, the middle portions are able to be bended relative to each other via a central flexible portion, and each of the corner portions is able to be bended relative to the corresponding middle portion via an inclined flexible portion.

5. The accessory as claimed in claim 1, wherein at least one of the first cover elements is attracted to at least one of the first device elements along a third edge of the electronic device substantially vertical to the first and second edges of the electronic device, the cover is flipped along the third edge of the electronic device and the first cover elements along the third edge attracted to the first cover element along the corresponding edge of the cover.

6. The accessory as claimed in claim 1, wherein the cover has a corner portion, and the corner portion is flipped to activate a function of the electronic device.

7. An accessory suitable for disposing on an electronic device, which has a plurality of first device elements disposed adjacent to first and second edges of the electronic device, the accessory comprising:

a cover has a plurality of first cover elements disposed in the cover and respectively adjacent to two edges of the cover opposite to each other, at least one of the first cover elements attracted to at least one of the first device elements along each of the two edges of the electronic device, wherein when the first cover element and the corresponding first device element are two magnets attracted to each other, a north pole and a south pole of the first cover element are arranged in a first axis which is parallel to the cover and perpendicular to edges of the cover corresponding to the first and the second edges of the electronic device, a north pole and a south pole of the first device element are arranged in a second axis which is opposite to the first axis, parallel to the cover, and perpendicular to the first and the second edges of the electronic device, wherein magnetic polarities of the first cover elements facing the edges of the cover are the same, wherein the placement of the first cover elements in the cover forms a symmetrical pattern respect to a third axis which is parallel to the first edge and goes through a geometrical center of the cover and a fourth axis which is parallel to the second edge and goes through the geometrical center of the cover, wherein the cover has a front surface and a rear surface opposite to each other and parallel to the first axis, and a distance between the first axis and the front surface is equal to a distance between the first axis and the rear surface, wherein when the cover is flipped, an attraction between the first cover element and the corresponding first device element is kept and one of the first and second edges of the electronic device is tightly attached to corresponding edge of the cover, and wherein the cover is able to rotate 360 degrees about each of the first and second edges of the electronic device.

8. The accessory as claimed in claim 7, wherein the cover has two middle portions and four corner portions, the middle portions are able to be bended relative to each other via a central flexible portion, and each of the corner portions is able to be bended relative to the corresponding middle portion via an inclined flexible portion.

9. The accessory as claimed in claim 8, wherein the middle portions are substantially trapezoid-plate-shaped, and the corner portions are substantially triangle-plate-shaped.

10. The accessory as claimed in claim 8, wherein the electronic device has a plurality of second device elements substantially located at the rear side of the electronic device and away from the edges of the electronic device, and the cover has a plurality of second cover elements substantially located in the middle portions away from the edges of the cover to attract the second device elements respectively.

11. The accessory as claimed in claim 8, wherein the cover has a plurality of shaping elements embedded in the corner portions respectively, and when the middle portions are bended relative to each other and a neighbor two of the corner portions are overlapped each other, the shaping elements in the neighbor two of the corner portions respectively attract each other.

12. The accessory as claimed in claim 8, wherein the cover has a plurality of first shaping elements embedded in the middle portions respectively and a plurality of second shaping elements embedded in the corner portions respectively, and when the middle portions are bended relative to each other and two of the corner portions are overlapped each other and contact the middle portion respectively, the first shaping elements attract the second shaping elements respectively.

13. The accessory as claimed in claim 7, wherein the cover has a half portion, a middle portion and two corner portions, the half portion is able to be bended relative to the middle portion via a central flexible portion, and each of the corner portions is able to be bended relative to the middle portion via an inclined flexible portion.

14. The accessory as claimed in claim 13, wherein the half portion is substantially rectangular-plate-shaped, the middle portions are substantially trapezoid-plate-shaped, and the corner portions are substantially triangle-plate-shaped.

15. The accessory as claimed in claim 13, wherein the electronic device has a plurality of second device elements substantially located at the rear side of the electronic device and away from the edges of the electronic device, and the cover has a plurality of second cover elements substantially located in the half portion and the middle portion away from the edges of the cover to attract the second device elements respectively.

16. The accessory as claimed in claim 13, wherein the cover has a plurality of shaping elements embedded in the corner portions respectively, and when the half portion and the middle portion are bended relative to each other and a neighbor two of the corner portions are overlapped each other, the shaping elements in the neighbor two of the corner portions respectively attract each other.

17. The accessory as claimed in claim 13, wherein the cover has a plurality of first shaping elements embedded in the half portion and a plurality of second shaping elements embedded in the corner portions respectively, and when the half portion and the middle portion are bended relative to each other and the corner portions contact the half portion, the first shaping elements attract the second shaping elements respectively.

18. The accessory as claimed in claim 7, comprising:
 a keyboard flexibly connected to one of the edges of the cover.

19. The accessory as claimed in claim 18, wherein the cover has a plurality of segments arranged side by side in sequence, and any adjacent two of the segments are able to be bended relative to each other via a flexible portion which is substantially parallel to the edges of the cover.

20. The accessory as claimed in claim 19, wherein the electronic device has at least one second device elements substantially located at the rear side of the electronic device and away from the edges of the electronic device, and the cover has at least one second cover elements substantially located in at least one of the segments away from the edges of the cover to attract the second device elements respectively.

21. The accessory as claimed in claim 20, wherein the keyboard is substantially rectangular-plate-shaped similar to the cover, one edge of the keyboard is flexibly connected to the corresponding edge of the cover, and the keyboard has a plurality of first keyboard elements embedded in the keyboard adjacent to the other edge of the keyboard.

22. The accessory as claimed in claim 18, wherein the keyboard has a plurality of second keyboard elements embedded in the keyboard and between the edges of the keyboard.

23. The accessory as claimed in claim 22, wherein the keyboard has a margin region and a keyboard region adjacent to the margin region, the second keyboard elements are between the margin region and the keyboard region.

\* \* \* \* \*